(12) United States Patent
Wang

(10) Patent No.: US 12,308,758 B2
(45) Date of Patent: May 20, 2025

(54) SWITCHING MODE POWER SUPPLY WITH STABLE ZERO CROSSING DETECTION, THE CONTROL CIRCUIT AND THE METHOD THEREOF

(71) Applicant: Chengdu Monolithic Power Systems Co., Ltd., Chengdu (CN)

(72) Inventor: Hao Wang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 215 days.

(21) Appl. No.: 17/946,336

(22) Filed: Sep. 16, 2022

(65) Prior Publication Data

US 2023/0107131 A1 Apr. 6, 2023

(30) Foreign Application Priority Data

Sep. 27, 2021 (CN) .......................... 202111139844.0

(51) Int. Cl.
*H02M 7/217* (2006.01)
*H02M 1/00* (2007.01)
*H02M 1/08* (2006.01)

(52) U.S. Cl.
CPC ....... *H02M 7/2176* (2013.01); *H02M 1/0058* (2021.05); *H02M 1/083* (2013.01)

(58) Field of Classification Search
CPC ...... H02M 1/0025; H02M 1/08; H02M 1/083; H02M 1/0058; H02M 1/0009
See application file for complete search history.

(56) References Cited

U.S. PATENT DOCUMENTS

| | | | |
|---|---|---|---|
| 9,621,028 B2 | 4/2017 | Lin et al. | |
| 10,855,171 B2 | 12/2020 | Lu | |
| 11,264,977 B1* | 3/2022 | Choi | H02M 1/0032 |
| 2011/0221414 A1* | 9/2011 | Pigott | H02M 3/1588 |
| | | | 323/283 |
| 2013/0154602 A1* | 6/2013 | Courtel | H02M 1/4225 |
| | | | 323/311 |
| 2014/0232189 A1* | 8/2014 | Gasparini | H02M 3/158 |
| | | | 307/31 |
| 2014/0285163 A1* | 9/2014 | Lin | H02M 1/4225 |
| | | | 323/205 |
| 2015/0180331 A1* | 6/2015 | Lin | H02M 1/4241 |
| | | | 363/84 |
| 2016/0380530 A1* | 12/2016 | Maruyama | H02M 1/4225 |
| | | | 323/210 |
| 2017/0264200 A1* | 9/2017 | Naito | H02M 1/36 |
| 2017/0288543 A1* | 10/2017 | Jing | H02M 1/12 |
| 2019/0260290 A1* | 8/2019 | Maejima | G01R 31/52 |
| 2022/0069712 A1* | 3/2022 | Mondal | H02M 1/0009 |
| 2022/0278603 A1* | 9/2022 | Peretz | H03M 1/502 |

OTHER PUBLICATIONS

U.S. Appl. No. 17/717,502, filed Apr. 11, 2022, Chengdu Monolithic Power Systems.

* cited by examiner

*Primary Examiner* — Gustavo A Rosario-Benitez
(74) *Attorney, Agent, or Firm* — Perkins Coie LLP

(57) ABSTRACT

A switching mode power supply with stable zero crossing detection is discussed. The switching mode power supply disables a ZCD function when the AC input voltage has a voltage value close to a voltage value of the output voltage, so that instable zero crossing detection issues are eliminated. Meantime, when the AC input voltage has a voltage value close to a voltage value of the output voltage, the switching mode power supply turns on a main power after a dead time.

16 Claims, 3 Drawing Sheets

SWITCHING MODE POWER SUPPLY WITH STABLE ZERO CROSSING DETECTION, THE CONTROL CIRCUIT AND THE METHOD THEREOF

CROSS-REFERENCE TO RELATED APPLICATIONS

This application claims priority to and the benefit of Chinese Patent Application No. 202111139844.0, filed Sep. 27, 2021, which is incorporated herein by reference in its entirety.

FIELD

The present invention relates to electronic circuits, more specifically, the present invention relates to switching mode power supplies, the control and the method thereof.

BACKGROUND

Boost converter is a widely used topology in AC-DC applications. In the boost control, zero current detection (ZCD) technology is typically used to improve the conversion efficiency under discontinuous current mode (DCM).

The boost converter typically includes a power stage which has a main power switch. The so-called ZCD technology means: during an OFF time period of the main power switch, a zero crossing condition of a current flowing through the power stage is detected to turn on the main power switch. Typically, a voltage across the main power switch is sensed, e.g., by way of an auxiliary winding. When a sensed voltage indicative of the voltage across the main power switch is lower than a zero reference voltage (e.g. 0.25V), indicating the voltage across the main power switch falls to its valley value (i.e., a lowest value that the voltage may fall to), the main power switch is turned on. Thus, the main power switch would be turned on at a lowest voltage, which is also called as valley switch-on technology. Thus, the turn-on power loss is reduced. However, in the AC-DC application, when the AC input voltage is close to the output voltage, the sensed voltage is very faint, causing unstable detection.

Thus, further improvement is needed.

SUMMARY

It is an object of the present invention to provide an improved switching mode power supply, which solves the above problems.

In accomplishing the above and other objects, there has been provided, in accordance with an embodiment of the present invention, a switching mode power supply, comprising a power stage circuit and a control circuit. The power stage circuit is configured to receive an AC input voltage via a rectified circuit, to generate an output voltage, the power stage circuit having at least a main power switch. The control circuit includes a zero crossing detector, a compare circuit, and a logical controller. The zero crossing detector is configured to detect a zero crossing condition of a current flowing through the power stage during an OFF time period of the main power switch, and to generate a set signal in response to a detect result of the zero crossing condition. The compare circuit is configured to judge whether a voltage value of the AC input voltage is close to a voltage value of the output voltage, to control the zero crossing detector: wherein the compare circuit is configured to shut down the zero crossing detector when the voltage value of the AC input voltage is close to the voltage value of the output voltage, to disable the detect result of the zero crossing condition. The logical controller is configured to generate a control signal to control the main power switch to be ON and OFF in response to the set signal.

In addition, there has been provided, in accordance with an embodiment of the present invention, a control circuit used in a switching mode power supply. The switching mode power supply includes a power stage circuit having at least a main power switch. The control circuit includes a zero crossing detector, a compare circuit, and a logical controller. The zero crossing detector is configured to detect a zero crossing condition of a current flowing through the power stage during an OFF time period of the main power switch, and to generate a set signal in response to a detect result of the zero crossing condition. The compare circuit is configured to judge whether a voltage value of the AC input voltage is close to a voltage value of the output voltage, to control the zero crossing detector: wherein the compare circuit is configured to shut down the zero crossing detector when the voltage value of the AC input voltage is close to the voltage value of the output voltage, to disable the detect result of the zero crossing condition. The logical controller is configured to generate a control signal to control the main power switch to be ON and OFF in response to the set signal.

Furthermore, there has been provided, in accordance with an embodiment of the present invention, a method used in a switching mode power supply. The method comprises: converting an AC input voltage to an output voltage by way of a rectified circuit and a power stage circuit, the power stage circuit including a main power switch being periodically turned on and off; detecting a zero crossing condition of a current flowing through the power stage circuit during an OFF time period of the main power switch, to control the main power switch based on a detect result of the zero crossing condition; and monitoring a voltage value of the AC input voltage and a voltage value of the output voltage, when the voltage value of the AC input voltage is close to the voltage value of the output voltage, disabling the detect result of the zero crossing condition.

The use of the similar reference label in different drawings indicates the same of like components.

DETAILED DESCRIPTION

Embodiments of circuits for switching mode power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
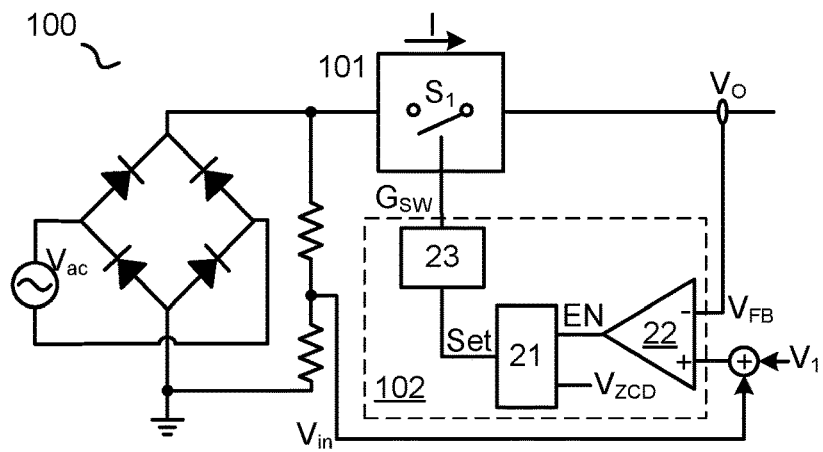
FIG. 1 schematically shows a switching mode power supply 100 in accordance with an embodiment of the present invention.
Figure 3:
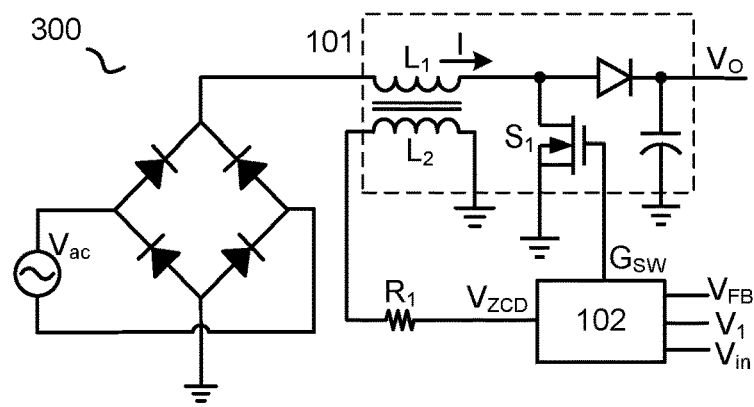
FIG. 3 schematically shows a switching mode power supply 300 in accordance with an embodiment of the present invention.

FIG. 1 schematically shows a switching mode power supply 100 in accordance with an embodiment of the present invention. In the example of FIG. 1, the switching mode power supply 100 comprises: a power stage circuit 101 and a control circuit 102. The power stage circuit 101 is configured to receive an AC input voltage $V_{ac}$ via a rectified circuit (e.g. a rectified bridge), to generate an output voltage $V_O$. The power stage circuit 101 includes at least a main power switch S1. The control circuit 102 comprises: a zero crossing detector 21, a compare circuit 22 and a logical controller 23. The zero crossing detector 21 is configured to detect a zero crossing condition of a current (I) flowing through the power stage during an OFF time period of the main power switch S1 (e.g., the current I flowing through an inductor L1 when the main power switch S1 is turned off, as shown in FIG. 3), and to generate a set signal (Set) in response to a detect result of the zero crossing condition. The compare circuit 22 is configured to judge whether the AC input voltage $V_{ac}$ has a voltage value close to the output voltage $V_O$, to control the zero crossing detector 21: wherein the compare circuit 22 is configured to shut down the zero crossing detector 21 when the voltage value of the AC input voltage $V_{ac}$ is close to that of the output voltage $V_O$, to disable the detect result of the zero crossing condition. The logical controller 23 is configured to generate a control signal Gsw to control the main power switch S1 to be ON and OFF in response to the set signal.

In one embodiment of the present invention, the voltage value of the AC input voltage $V_{ac}$ is close to the output voltage $V_O$ means a difference between absolute voltage values of the AC input voltage $V_{ac}$ and the output voltage $V_O$ is very small, e.g., the difference may be 0.07V.

In one embodiment of the present invention, when the zero crossing detector 21 is shut down, the turn-on of the main power switch $S_1$ is independent of the detect result of the zero crossing condition. If the zero crossing detector 21 is not shut down, the main power switch $S_1$ is controlled by the detect result of the zero crossing condition. In one embodiment of the present invention, the action of shutting down the zero crossing detector 21 may be performed by pulling high the detect result of the zero crossing condition, e.g. using a pull-up switch to pull the detect result of the zero crossing condition to a power supply, or using a logical OR circuit to pull high the detect result of the zero crossing condition with a logical high level, or using digital control methods (e.g., using a logical high digital signal to replace the detect result of the zero crossing condition), etc., which are all well known in the art.

In the example of FIG. 1, the compare circuit 22 is configured to compare a voltage difference between a feedforward voltage $V_{in}$ indicative of a rectified signal of the AC input voltage $V_{ac}$ and a feedback voltage $V_{FB}$ indicative of the output voltage with a threshold voltage $V_1$, to judge whether the voltage value of the AC input voltage $V_{ac}$ is close to that of the output voltage $V_O$. Specifically, in the example of FIG. 1, the compare circuit 22 is configured to compare a sum of the feedforward voltage Vin and the threshold voltage $V_1$ with the feedback voltage $V_{FB}$, to control the zero crossing detector 21: when the sum of the feedforward voltage $V_{in}$ and the threshold voltage $V_1$ is higher than the feedback voltage $V_{FB}$, indicating the AC input voltage $V_{ac}$ is close to the output voltage $V_O$, the detect result is disabled. The threshold voltage $V_1$ has a voltage value around zero, e.g., in one embodiment of the present invention, $V_1$=0.07V.

Figure 2:
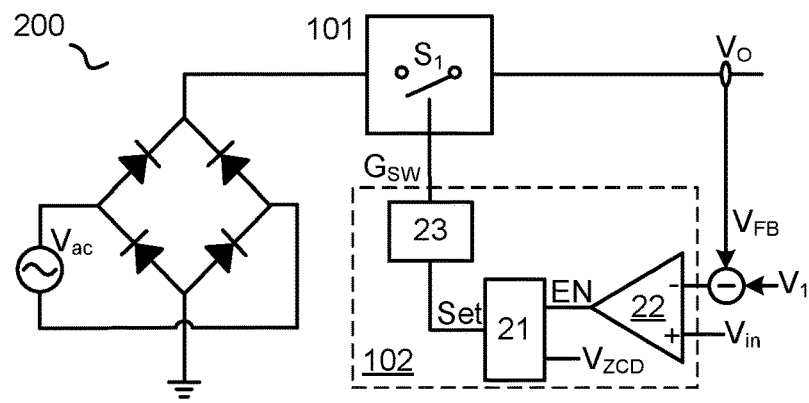
FIG. 2 schematically shows a switching mode power supply 200 in accordance with an embodiment of the present invention.

In one embodiment of the present invention, the compare circuit 22 may also be configured to compare a difference between the feedback voltage $V_{FB}$ and the threshold voltage $V_1$ with the feedforward voltage $V_{in}$, to control the zero crossing detector 21, as shown in FIG. 2, which schematically shows a circuit configuration of a switching mode power supply 200. When the difference between the feedback voltage $V_{FB}$ and the threshold voltage $V_1$ is lower than the feedforward voltage Vin, indicating the voltage value of the AC input voltage $V_{ac}$ is close to the output voltage $V_O$, the detect result of the zero crossing condition is disabled.

In one embodiment of the present invention, the power stage circuit 101 comprises a boost converter; and the zero crossing detect is performed through an auxiliary winding, as shown in FIG. 3. The boost converter includes an inductor $L_1$, the main power switch S1, a diode and an output capacitor. In the example of FIG. 3, the switching mode power supply further comprises an auxiliary winding $L_2$, magnetically coupled with the inductor $L_1$. A sense signal $V_{ZCD}$ indicative of the voltage across the main power switch $S_1$ is generated through the auxiliary winding $L_2$ and a resistor $R_1$.

Figure 4:
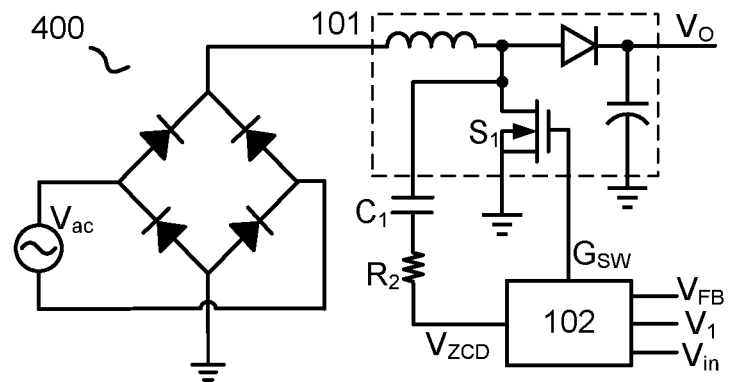
FIG. 4 schematically shows a switching mode power supply 400 in accordance with an embodiment of the present invention.

In other embodiments of the present invention, the zero crossing detect is performed through a resistor and a capacitor, as shown in FIG. 4. The voltage across the main power switch $S_1$ is delivered to the control circuit 102 via a resistor $R_2$ and a capacitor $C_1$, to provide the sense signal $V_{ZCD}$.

The zero crossing detect methods shown in FIG. 3 and FIG. 4 are merely two examples. One skilled in the art should realize that other appropriate approaches may also be used to detect the zero crossing condition of the current flowing through the power stage circuit.

Figure 5:
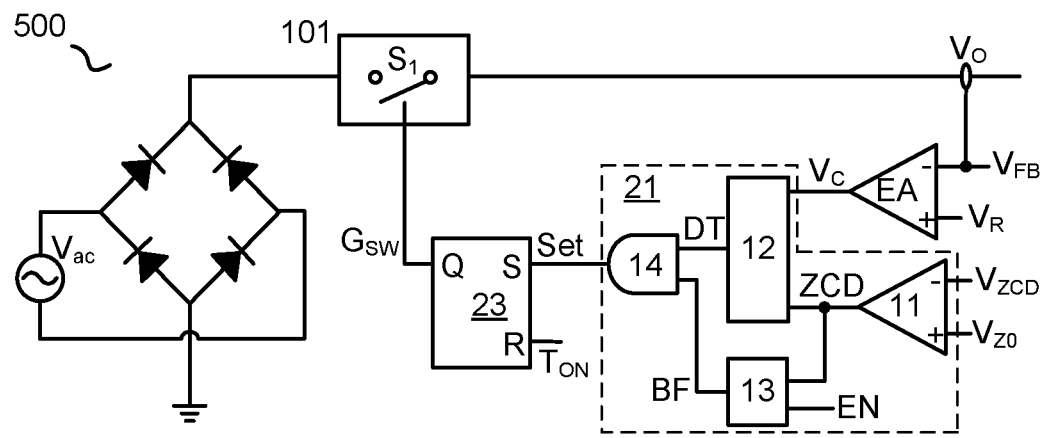
FIG. 5 schematically shows a switching mode power supply 500 in accordance with an embodiment of the present invention.

FIG. 5 schematically shows a switching mode power supply 500 with a circuit configuration of the zero crossing detector 21 in accordance with an embodiment of the present invention. In the example of FIG. 5, the zero crossing detector 21 comprises: a zero crossing comparator 11, a timer 12, a buffer 13 and a logical AND circuit 14. The zero crossing comparator 11 is configured to compare the sense signal $V_{ZCD}$ with a zero reference voltage $V_{Z0}$, to generate the detect result (ZCD) of the zero crossing condition. The timer 12 is configured to generate a dead time signal DT in response to the output voltage $V_O$ (e.g. a compensation signal $V_C$ indicative of the output voltage $V_O$) and the detect result (ZCD) of the zero crossing condition. The buffer 13 is configured to buffer the detect result (ZCD) of the zero crossing condition, to generate a buffer signal BF. Besides, the buffer 13 is also configured to respond to the comparison result EN of the compare circuit 22: when the voltage value of the AC input voltage is close to the output voltage $V_O$, the buffer 13 would pull the buffer signal BF to be high. The logical AND circuit 14 is configured to perform a logical AND operation on the dead time signal DT and the buffer signal BF, to generate the set signal Set.

In one embodiment of the present invention, the zero reference voltage $V_{Z0}$ has a voltage value close to zero, e.g., $V_{Z0}$=0.03V.

In one embodiment of the present invention, the switching mode power supply 500 further comprises an error amplifier EA, configured to amplify and integrate a difference between the feedback voltage $V_{FB}$ and a voltage reference $V_R$, to generate the compensation signal $V_C$.

In one embodiment of the present invention, when the voltage value of the AC input voltage $V_{ac}$ is close to the output voltage $V_O$, the buffer signal BF is pulled high.

In one embodiment of the present invention, the logical controller 23 comprises a RS flip flop, including: a set terminal S, configured to be set by the set signal Set, to turn on the main power switch $S_1$; and a reset terminal R, configured to be reset by an ON time signal TON, to turn off the main power switch $S_1$. In one embodiment of the present invention, the ON time signal TON is generated by an ON time generator (not shown). The AC input voltage $V_{ac}$ may be compensated by the ON time generator, to regulate the load transient response.

Figure 6:
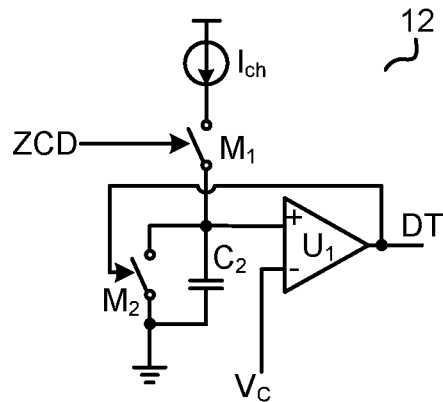
FIG. 6 schematically shows a circuit configuration of the timer 12 in accordance with an embodiment of the present invention.

FIG. 6 schematically shows a circuit configuration of the timer 12 in accordance with an embodiment of the present invention. In the example of FIG. 6, the timer 12 comprises: a connect switch $M_1$, configured to be turned on in response to the detect result (ZCD) of the zero crossing condition, so that a capacitor $C_2$ is configured to be charged by a current source $I_{ch}$; a time comparator $U_1$, configured to compare a voltage across the capacitor $C_2$ with the compensation signal $V_C$, to generate the dead time signal DT; and a reset switch $M_2$, configured to reset the capacitor $C_2$ in response to the dead time signal DT. The example shown in FIG. 6 is merely one of the implementations of the timer 12. One skilled in the art should realize that the timer 12 can be performed by many other ways, such as using digital ways, to have the timer: a) start a timing in response to the detect result, and b) end the timing in response to the compensation signal $V_C$.

Figure 7:
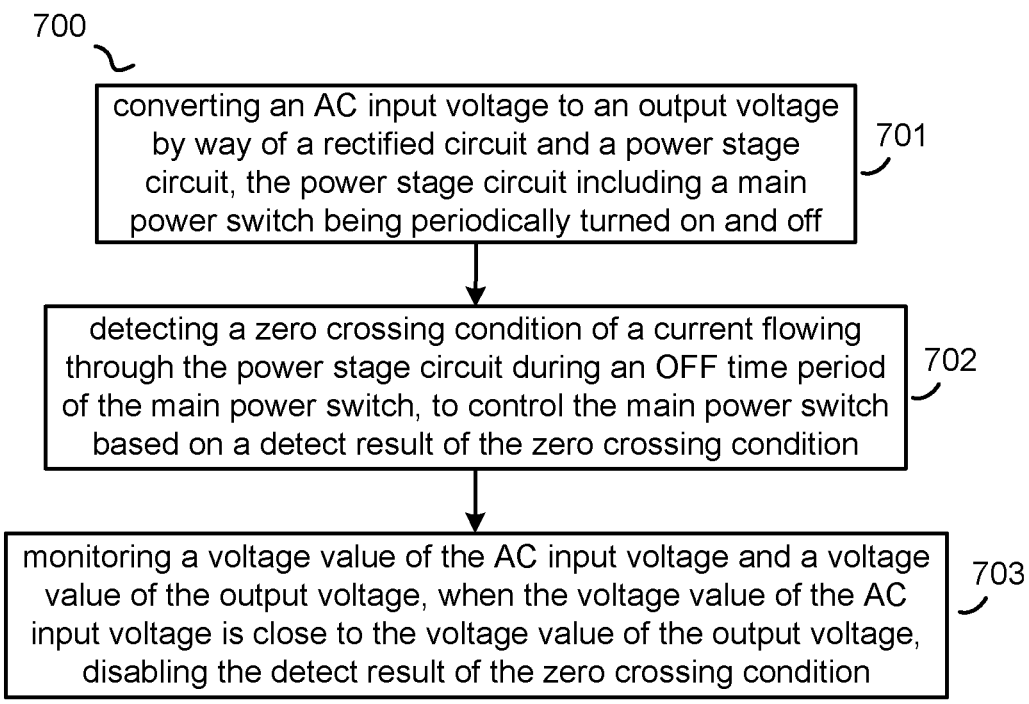
FIG. 7 schematically shows a flowchart 700 of a method used in a switching mode power supply in accordance with an embodiment of the present invention.

FIG. 7 schematically shows a flowchart 700 of a method used in a switching mode power supply in accordance with an embodiment of the present invention. The method comprising:

Step 701, converting an AC input voltage to an output voltage by way of a rectified circuit and a power stage circuit, the power stage circuit including a main power switch being periodically turned on and off.

Step 702, detecting a zero crossing condition of a current flowing through the power stage circuit during an OFF time period of the main power switch, to control the main power switch based on a detect result of the zero crossing condition. And Step 703, monitoring a voltage value of the AC input voltage and a voltage value of the output voltage, when the voltage value of the AC input voltage is close to that of the output voltage, disabling the detect result of the zero crossing condition.

In one embodiment of the present invention, a difference between the voltage values of the AC input voltage and the output voltage is compared with a threshold value, to judge whether the voltage value of the AC input voltage is close to that of the output voltage: when the difference between the voltage values of the AC input voltage and the output voltage is lower than the threshold value, the voltage value of the AC input voltage is close to that of the output voltage.

In one embodiment of the present invention, disabling the detect result of the zero crossing condition comprises: pulling high the detect result of the zero crossing condition, or using a logical high level to replace the detect result of the zero crossing condition.

In one embodiment of the present invention, the step of detecting the zero crossing condition of the current flowing through the power stage circuit comprises: detecting a voltage across the main power switch, when the voltage is lower than a zero reference voltage, indicating the current crosses zero.

In one embodiment of the present invention, the method further comprising: when the voltage value of the AC input voltage is not close to that of the output voltage, starting a timing in response to the detect result of the zero crossing condition, until the timing reaches a time length determined by the output voltage; continuing detecting the zero crossing condition of the current flowing through the power stage circuit; and turning on the main power switch when the current through the power stage circuit crosses zero again. When the voltage value of the AC input voltage is close to that of the output voltage, starting timing in response to the detect result of the zero crossing condition, and turning on the main power switch when the timing reaches the time length determined by the output voltage.

Several embodiments of the foregoing switching mode power supply improve system performance compared to conventional technique. Unlike the conventional technique, several embodiments of the foregoing switching mode power supply shut down the zero crossing detector and pull high the zero crossing detect result when the voltage value of the AC input voltage is close to the output voltage, thus the issues caused by the instable zero crossing detection are solved.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A switching mode power supply, comprising:
a power stage circuit, configured to receive an AC input voltage via a rectified circuit, to generate an output voltage, the power stage circuit having at least a main power switch; and
a control circuit, including:
a zero crossing detector, configured to detect a zero crossing condition of a current flowing through the power stage during an OFF time period of the main power switch, and to generate a set signal in response to a detect result of the zero crossing condition;
a compare circuit, configured to judge whether a voltage value of the AC input voltage is close to a voltage value of the output voltage, to control the zero crossing detector: wherein the compare circuit is configured to shut down the zero crossing detector when the voltage value of the AC input voltage is close to the voltage value of the output voltage, to disable the detect result of the zero crossing condition; and a logical controller, configured to generate a control signal to control the main power switch to be ON and OFF in response to the set signal; wherein when the voltage value of the AC input voltage is close to the voltage value of the output voltage, and the detect result of the zero crossing condition is disabled, the logical controller is configured to turn on the main power switch in response to a dead time signal.

2. The switching mode power supply of claim 1, wherein:

a sum of a feedforward voltage indicative of a rectified signal of the AC input voltage and a threshold voltage is compared with a feedback voltage indicative of the output voltage, to judge whether the voltage value of the AC input voltage is close to the voltage value of the output voltage.

3. The switching mode power supply of claim 1, wherein the detect result of the zero crossing condition is disabled by pulling high the detect result of the zero crossing condition, or by using a logical high level to replace the detect result of the zero crossing condition.

4. The switching mode power supply of claim 1, wherein the zero crossing detector comprises:

a zero crossing comparator, configured to compare a sense signal indicative of a voltage across the main power switch with a zero reference voltage, to generate the detect result of the zero crossing condition;

a timer, configured to generate the dead time signal in response to the output voltage and the detect result of the zero crossing condition;

a buffer, configured to buffer the detect result of the zero crossing condition, to generate a buffer signal; wherein the buffer is also configured to respond to a comparison result of the compare circuit: when the voltage value of the AC input voltage is close to the voltage value of the output voltage, the buffer is configured to pull the buffer signal to be high; and a logical AND circuit, configured to perform a logical AND operation on the dead time signal and the buffer signal, to generate the set signal.

5. The switching mode power supply of claim 4, wherein:

The timer is configured to start a timing in response to the detect result of the zero crossing condition, and to end the timing in response to the output voltage.

6. A control circuit used in a switching mode power supply, the switching mode power supply including a power stage circuit having at least a main power switch, the control circuit comprising:

a zero crossing detector, configured to detect a zero crossing condition of a current flowing through the power stage during an OFF time period of the main power switch, and to generate a set signal in response to a detect result of the zero crossing condition;

a compare circuit, configured to judge whether a voltage value of an AC input voltage is close to a voltage value of an output voltage, to control the zero crossing detector: wherein the compare circuit is configured to shut down the zero crossing detector when the voltage value of the AC input voltage is close to the voltage value of the output voltage, to disable the detect result of the zero crossing condition; and a logical controller, configured to generate a control signal to control the main power switch to be ON and OFF in response to the set signal; wherein when the voltage value of the AC input voltage is close to the voltage value of the output voltage, and the detect result of the zero crossing condition is disabled, the logical controller is configured to turn on the main power switch in response to a dead time signal.

7. The control circuit of claim 6, wherein:

a sum of a feedforward voltage indicative of a rectified signal of the AC input voltage and a threshold voltage is compared with a feedback voltage indicative of the output voltage, to judge whether the voltage value of the AC input voltage is close to the voltage value of the output voltage.

8. The control circuit of claim 6, wherein: the detect result of the zero crossing condition is disabled by pulling high the detect result of the zero crossing condition, or by using a logical high level to replace the detect result of the zero crossing condition.

9. The control circuit of claim 6, wherein the zero crossing detector comprises:

a zero crossing comparator, configured to compare a sense signal indicative of a voltage across the main power switch with a zero reference voltage, to generate the detect result of the zero crossing condition;

a timer, configured to generate the dead time signal in response to the output voltage and the detect result of the zero crossing condition;

a buffer, configured to buffer the detect result of the zero crossing condition, to generate a buffer signal; wherein the buffer is also configured to respond to a comparison result of the compare circuit: when the voltage value of the AC input voltage is close to the voltage value of the output voltage, the buffer is configured to pull the buffer signal to be high; and a logical AND circuit, configured to perform a logical AND operation on the dead time signal and the buffer signal, to generate the set signal.

10. The control circuit of claim 9, wherein:

The timer is configured to start a timing in response to the detect result, of the zero crossing condition and to end the timing in response to the output voltage.

11. A method used in a switching mode power supply, comprising:

converting an AC input voltage to an output voltage by way of a rectified circuit and a power stage circuit, the power stage circuit including a main power switch being periodically turned on and off;

detecting a zero crossing condition of a current flowing through the power stage circuit during an OFF time period of the main power switch, to generate a set signal based on a detect result of the zero crossing condition, wherein the main power switch is controlled be ON and OFF in response to the set signal; and monitoring a voltage value of the AC input voltage and a voltage value of the output voltage, when the voltage value of the AC input voltage is close to the voltage value of the output voltage, disabling the detect result of the zero crossing condition, and turning on the main power switch in response to a dead time signal.

12. The method of claim 11, wherein:

a sum of the AC input voltage and a threshold voltage is compared with the output voltage, to judge whether the voltage value of the AC input voltage is close to the voltage value of the output voltage.

13. The method of claim 11, wherein the step of disabling the detect result of the zero crossing condition comprises:

pulling high the detect result of the zero crossing condition; or using a logical high level to replace the detect result of the zero crossing condition.

14. The method of claim 11, wherein the step of detecting the zero crossing condition of the current flowing through the power stage circuit comprises:
   detecting a voltage across the main power switch, when the voltage is lower than a zero reference voltage, indicating the current crosses zero.

15. The method of claim 11, further comprising:
   when the voltage value of the AC input voltage is not close to the voltage value of the output voltage:
      starting a timing in response to the detect result of the zero crossing condition, until the timing reaches a time length determined by the output voltage;
      continuing detecting the zero crossing condition of the current flowing through the power stage circuit; and
      turning on the main power switch when the current through the power stage circuit crosses zero again.

16. The method of claim 11, further comprising:
   when the voltage value of the AC input voltage is close to the voltage value of the output voltage:
      starting timing in response to the detect result of the zero crossing condition; and
      turning on the main power switch when the timing reaches the time length determined by the output voltage.

* * * * *